INVENTORS
Douglas Frank Twiss,
Edward Arthur Murphy,
BY D. Anthony Usina
ATTORNEY

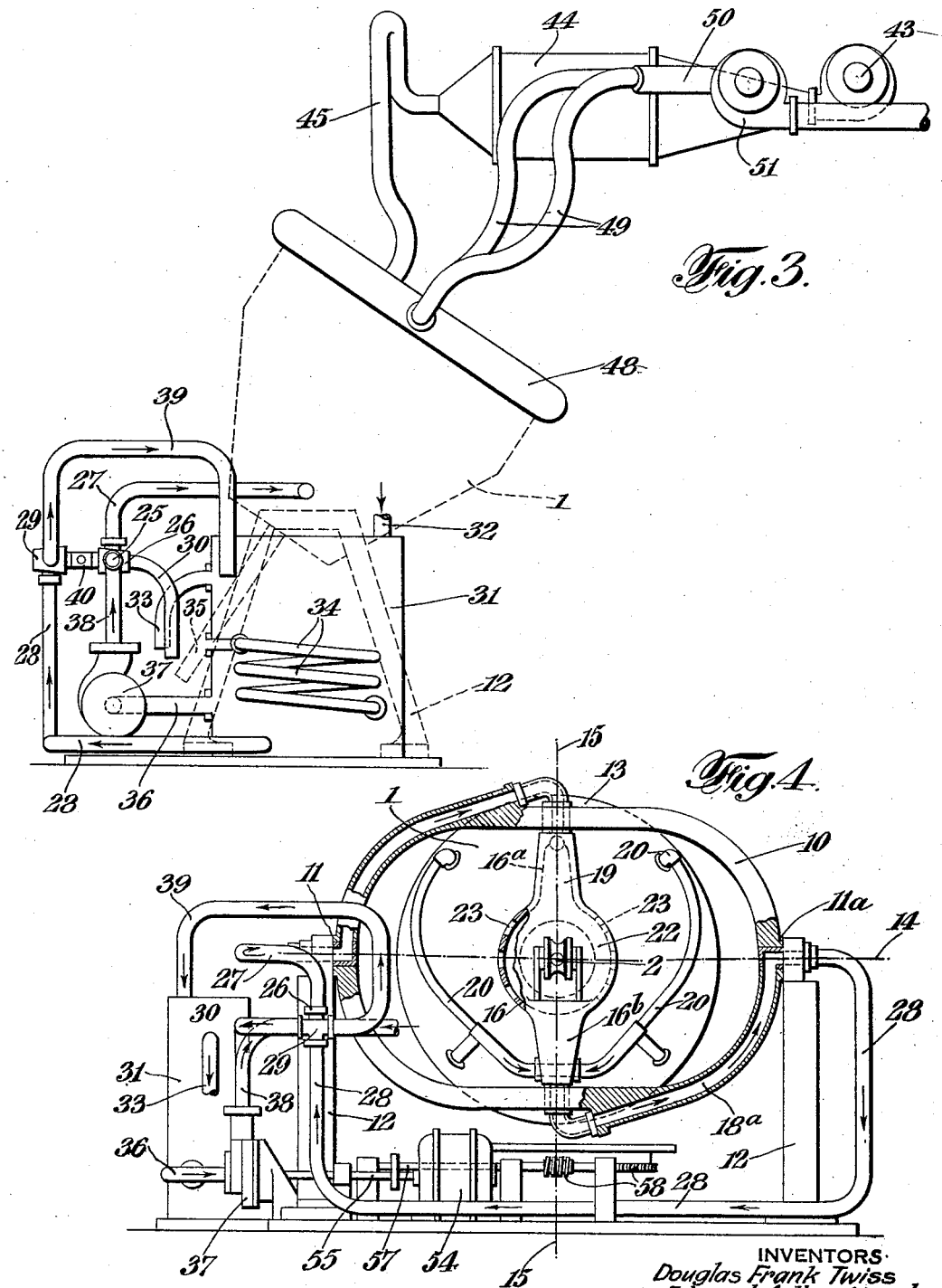
Feb. 21, 1933. D. F. TWISS ET AL 1,898,604
METHOD AND APPARATUS FOR CONCENTRATING LIQUIDS
Filed Nov. 2, 1928   4 Sheets-Sheet 2
INVENTORS
Douglas Frank Twiss
Edward Arthur Murphy
BY D. Anthony Usina
ATTORNEY

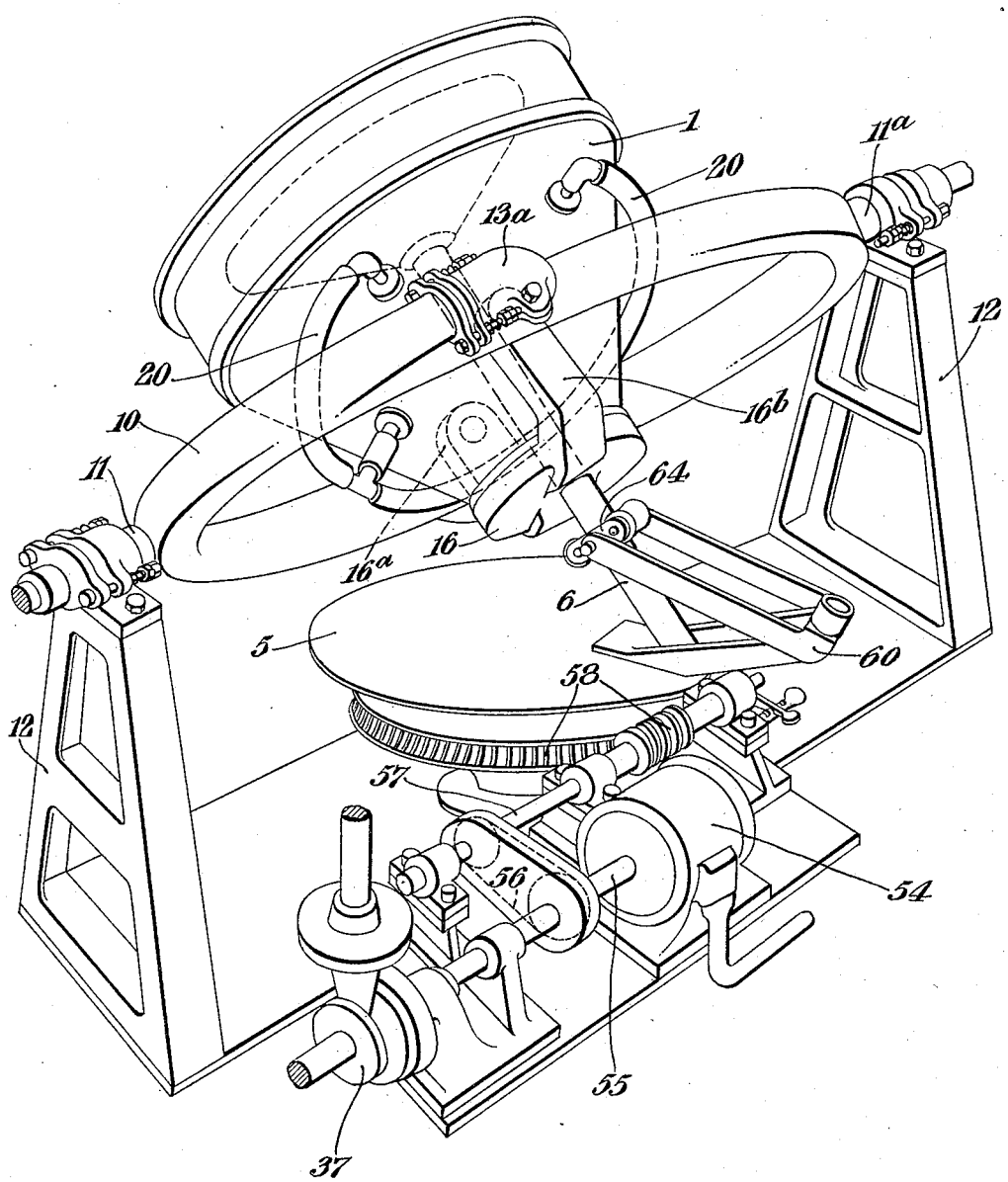

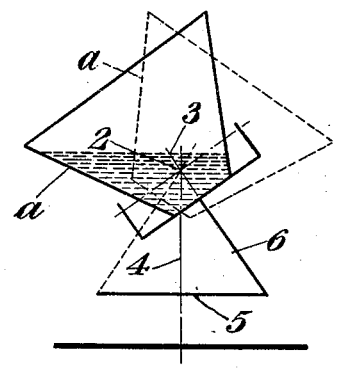
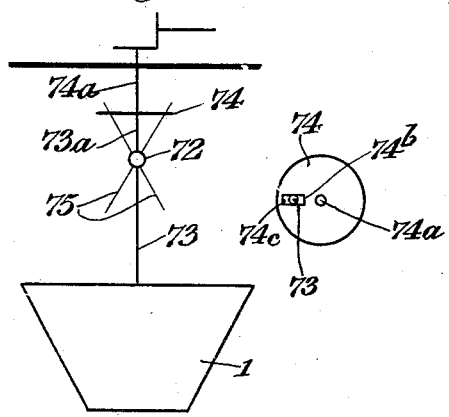
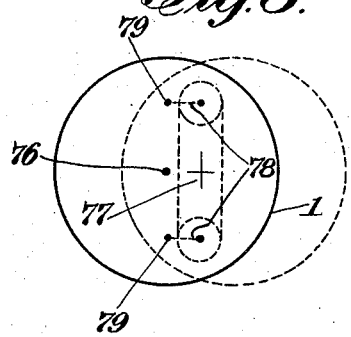
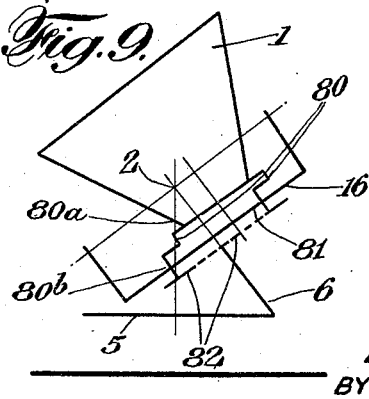

Patented Feb. 21, 1933

1,898,604

UNITED STATES PATENT OFFICE

DOUGLAS FRANK TWISS AND EDWARD ARTHUR MURPHY, OF FORT DUNLOP, ERDINGTON, BIRMINGHAM, ENGLAND, ASSIGNORS TO DUNLOP RUBBER COMPANY, LIMITED, OF BIRMINGHAM, ENGLAND, A BRITISH CORPORATION

METHOD AND APPARATUS FOR CONCENTRATING LIQUIDS

Application filed November 2, 1928, Serial No. 316,722, and in Great Britain November 3, 1927.

This invention relates to an improved method and apparatus for the concentration or compounding of liquids such as aqueous dispersions—more particularly such liquids as those which offer difficulties when undergoing the processes of concentration or compounding; such difficulties for example as deleterious skin formation, frothing or sedimentation.

Thus, for example, the liquids may be latices or dispersion of rubber and similar vegetable resins—for instance, natural or preserved or artificially prepared dispersions of rubber, gutta percha, balata and similar materials or a combination of them, whether in a vulcanized or unvulcanized condition and containing or not one or more additional ingredients for example stabilizers, fillers, reinforcing agents, accelerators, coloring matters, preservatives, softeners or anti-agers.

The liquids or materials will hereinafter be referred to as "the liquid" but this term is not to be taken as having per se any particular significance—for instance, it should be understood that the said liquids may already, that is before being subjected to the processes of our invention, have been subjected to a partial evaporation.

The concentration or evaporation is conveniently carried out concurrently with compounding in such a way that the dispersion of the compounding ingredients is facilitated to an extreme degree—this being an important feature of our invention, namely that it enables compounding ingredients to be uniformly distributed throughout the liquid while the same is undergoing concentration—without premature coagulation, thereby to produce a smooth concentrate, conveniently of cream-like consistency, containing compounding ingredients uniformly distributed throughout its mass.

Thus when we apply this concentrate to the coating of fabric or to the production of articles by the deposition of said concentrate onto suitable formers the film or layer is uniform and does not contain patches containing more or less compounding ingredients than the rest of the deposition. Again a very desirable uniformity of large numbers of products is possible—the bulk concentrate from which they are produced being from first to last always in substantially the same condition.

According to one phase of this invention concentration or evaporation and/or compounding or mixing a liquid of the kind hereinbefore specified is effected by a method, and means for carrying the same into effect, which includes the step of submitting at least one surface of a vessel which contains said liquid to a rocking, oscillating or other analogous motion, by submitting a surface of such vessel to motion without rotation of the vessel on its own axis, by submitting such surface or surfaces to a rocking, oscillating or other analogous motion without rotation of the vessel on its own axis, or in general by continually altering the angular relationship between the substantially plane surface of the liquid and the walls of the container.

More specifically for the purpose of concentration the invention consists in applying such a motion successively to cover and uncover such surface or surfaces by the bulk of the liquid, thereby to spread a layer or film of said liquid upon said surface, which layer or film is obviously susceptible of a comparatively rapid partial evaporation.

In passing, it may be said that the preferred effect we produce is in very general terms somewhat similar to that produced by a person who, holding tightly in his hand an ordinary glass tumbler containing a small quantity of liquid, revolves said tumbler bodily in a small orbit. The tumbler being stationary on its own axis, the effect produced will be a continuous and successive alteration of the relationship of the liquid surface and the tumbler walls.

The invention further consists in submitting such an exposed surface or film to the action of a dehydrating agent say a current of air or other gas, in maintaining the vessel under a pressure less than atmospheric, in heating the liquid while undergoing treatment, in subsequently cooling said liquid, and in various other features which will become hereinafter apparent.

Arising out of and being more or less associated with these provisions and features of this phase of our invention another phase of it becomes apparent, namely that according to which we are enabled to produce a concentrate of the kind specified by submitting the liquid at once to a partial evaporation and a form of gentle continuous dispersive agitation, the method and means according to the first phase, of our invention being particularly suited to meet the requirements embodied in this second phase of our said invention—the motion relative between the vessel and the liquid being such as effectively to produce the gentle continuous dispersive agitation required.

It may be said in passing that various types of apparatus have before been proposed for the concentration or coagulation of rubber latex and the like dispersions all of which, however, involve the use of a spreading surface or surfaces subject to rotation. For example a horizontal rotating drum or cylinder on the inner or outer surface of which a film of the dispersion is subjected continuously to evaporation has been employed; while, alternatively, an endless continuously rotating band dipping into a bath of the dispersion for continuously exposing a fresh surface to evaporation has been utilized.

It will however be apparent from the preamble to the present specification, and it will become more apparent as the description proceeds, that the present invention is in all its aspects far removed from such schemes as these.

In order that our invention may be more easily understood and readily carried into effect the same will now be described more fully in relation to one form of apparatus for carrying out the said invention.

In the accompanying drawings—

Fig. 3 is a side view more or less diagrammatic and not necessarily to scale illustrating the heating and cooling and the air or like flow provision;

Fig. 4 is a back view also more or less diagrammatic viewed from the left of Fig. 3 showing the vessel tilted as for emptying and illustrating the circulation of the heating and cooling medium;

Fig. 5 is a general perspective view of the said preferred form of apparatus;

Fig. 6 is a diagram illustrating the motion effected in the said preferred apparatus;

Figs. 7, 8 and 9 are diagrams illustrating various alternative ways of producing an analogous effect.

Figure 1:
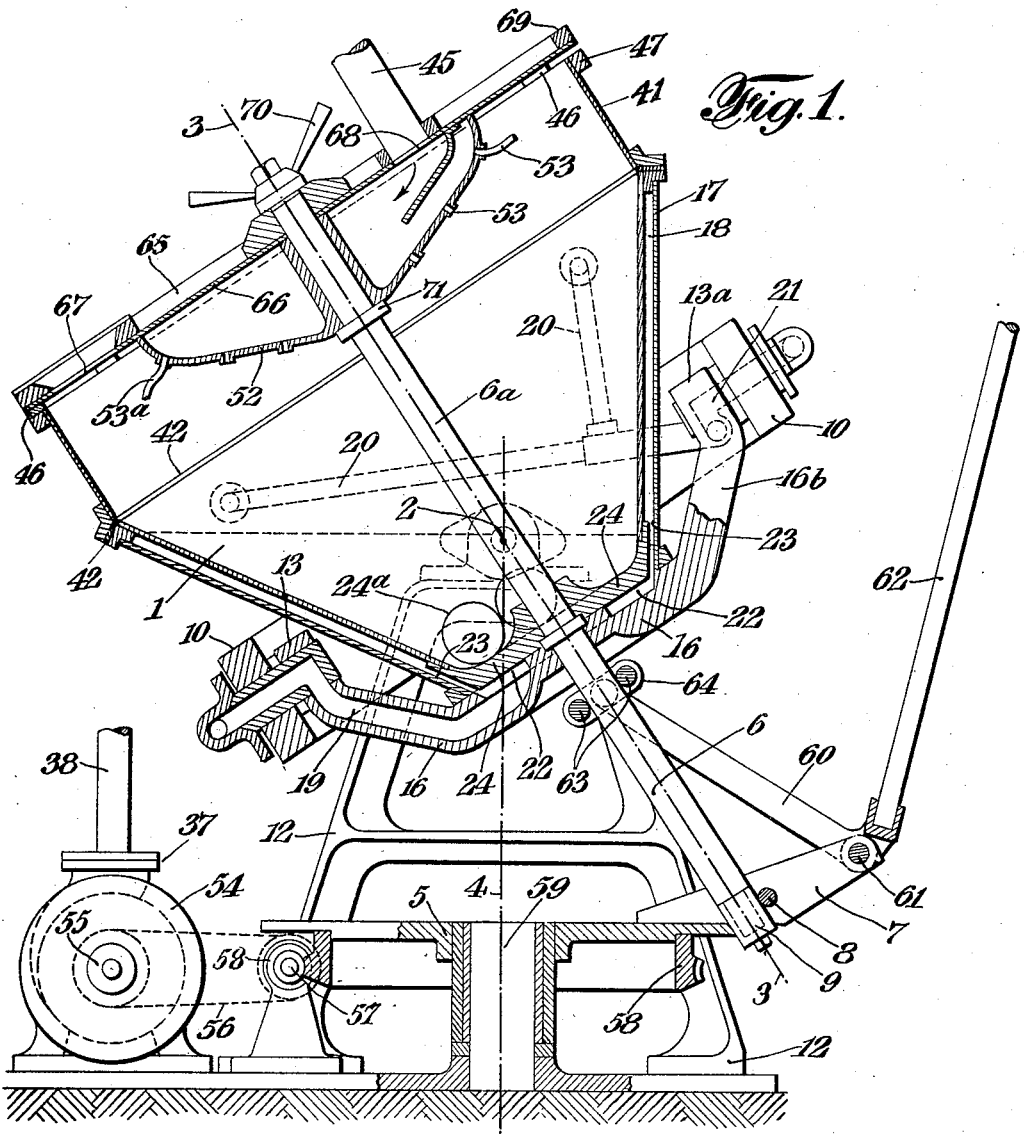
Fig. 1 is a side view in cross-section of the preferred form of apparatus according to this invention.

In the preferred form of apparatus illustrated in Figures 1 to 6 inclusive the same comprises a vessel or container disposed in such a way as to be universally oscillatable about a point 2—said point being preferably positioned within the confines of the vessel, thereby to obviate any ill effects arising from any undesirable degree of centrifugal force.

Said universal oscillation is effected in the preferred form by disposing the axis 3 of the vessel at an angle to the vertical axis 4 and revolving the canted axis 3 together with the vessel 1 bodily about the said vertical axis 4 upon the point 2.

In the preferred form this bodily revolution is effected by means comprising a driving bracket which as shown in drawings may be in the form of a table 5 rotatable on the axis 4 and formed at its edge to engage the free end of an inclined rod or shaft 6 attached to the vessel.

Probably the motion effected in this preferred form of our apparatus is most apparent from diagram Figure 6. Half a revolution of the table 5 takes the side $a$ of the vessel from the position shown in full lines to that shown in dotted lines—the other half revolution takes said side $a$ down again through the reverse of the same path—said side $a$ never crossing the axis 4. It being appreciated that the side $a$ shown full is precisely the same side of the vessel as the side $a$ shown dotted, it will be apparent that, while the vessel as a whole oscillates bodily on the point 2, its surfaces have local oscillation between said positions shown in full lines and in dotted lines.

Referring again to Figure 1, in the arrangement shown therein said shaft 6 is rigid with the vessel and the engagement of said shaft and said table allows of relative movement between said shaft and table.

Figure 2:
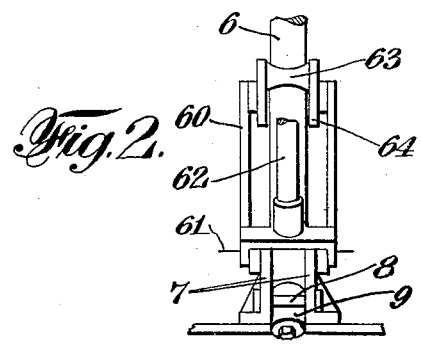
Fig. 2 is a detail thereof looking from the right of Fig. 1.

A convenient construction, as shown is that said shaft passes freely between a pair of brackets 7 on said table between which said brackets said rod is anchored by a pin 8 passing between said brackets as shown in Figures 1 and 2. Antifriction means such as a bearing bush 9 upon the end of the shaft may be provided if desired between said shaft and said brackets.

In the preferred form of apparatus according to this invention the bodily revolution of said shaft 6 about the axis 4 is accommodated so as to effect the desired universal oscillation of the vessel about the point 2 with the aid of a gimbal or universal joint structure.

As shown in the drawings such structure conveniently comprises an annular yoke 10 pivotally mounted at 11 and 11ᵃ in bearing standards 12 to which said yoke the vessel 1 is pivotally mounted at 13 and 13a, the axis 14 of the yoke bearings 11—11a and the axis 15 of the vessel bearings 13—13a intersecting at the point 2.

The vessel tends to oscillate simply on these two said axes 14 and 15 and the resultant—said axes crossing as they do—is the combination or universal oscillation referred to of the vessel about the common point 2.

The mounting of the vessel 1 in the yoke 10 conveniently comprises a transverse bearing member 16 rigid with the base of the vessel and having outwardly extending arms 16a and 16b between the same and the vessel bearing 13—13a in the yoke 10.

It will be seen that this arrangement which includes a gimbal or like scheme is particularly adapted for the provision of the centre of oscillation or point 2 within the confines of the vessel as already said.

Provision is made for heating the liquid during its treatment in the vessel, the same conveniently comprising a jacket surrounding the vessel for the circulation of a heating medium.

As shown in the drawings said jacket comprises a shell 17 of corresponding shape to the vessel arranged to leave a space 18 through which the heating medium circulates.

In the preferred design said medium circulates via certain of the bearings which combine for the support of the vessel—said medium conveniently circulating as follows in the direction of the arrows in Figure 4:—from and through the yoke bearing 11 to the vessel bearing 13, through said bearing and through the vessel to the opposite vessel bearing 13a, through said bearing and from thence to the other yoke bearing 11a and away.

As shown in the drawings, conveniently the connection between the bearings 11 and 13 and the bearings 13a and 11a is via channels 18 and 18a formed in the material of the yoke 10, while the connection from the vessel bearing 13 to the vessel is via a channel 19 in the bearing arm 16a, and the connection from the vessel to the bearing 13a is by fixed pipes 20 communicating with an orifice or channel 21 in the other bearing arm 16b.

The communication between the channel 19 and the vessel is conveniently via an annular channel 22 formed in the transverse member 16 which channel 22 connects with the space 18 in the jacket by orifices 23 formed in the base 24 upon which the respective shells of the vessel and the jacket are built up.

To prevent deleterious effects arising from exposure or cooling of the hot concentrates in a stated condition, as in the vessel after cessation of motion thereof or after discharge of the liquids from the vessel, we preferably make provision for said liquids to be cooled prior to discharge and while the motions of the vessel are proceeding. Conveniently, said provision consists in circulating through the system already described for heating, a cooling fluid such as cold water.

Obviously the system between the outlet yoke bearing 11a back to the inlet yoke bearing 11 may be of any convenient kind,—preferably however it is such that the heating fluid circulates through a closed system by a pump, for economy in heat, while the cold fluid circulates direct from the mains.

As shown particularly in Figures 3 and 4, cold water flows into the system through pipe 25 directly from the mains. Thence through cock 26 and up pipe 27 into vessel at bearing 11. Next, through the vessel and then out at bearing 11a through pipe 28 to cock 29 and pipe 30 to drain.

Water in tank 31 is supplied through pipe 32 and overflows to drain through pipe 33. Said tank is heated by a steam coil 34 fed through 35—provision being preferably incorporated for the regulation of the temperature.

Hot water flows into the system from the tank 31 through pipe 36 to the pump 37 which circulates it. From said pump it is forced up pipe 38 through cock 26 and pipe 27 into vessel. Through vessel out at bearing 11a through pipe 28, cock 29 and pipe 39 back to tank 31.

For cold water to circulate; the cock 26 opens vessel feed pipe 27 to cold water supply pipe 25 and closes hot water supply pipe 23; the cock 29 opens vessel drain pipe 28 to cold water drain pipe 30 and closes said pipe 28 to hot water tank return pipe 39.

For hot water to circulate; the cock 26 closes cold water supply pipe 25 and opens hot water supply pipe 38 to vessel feed pipe 27; cock 29 closes cold water drain pipe 30 and opens vessel drain pipe 28 to hot water tank return pipe 39. The cocks 26 and 29 are commonly actuated by a handle 40.

A feature of our invention is that the heating medium may operate more directly upon the bulk of the liquid than upon a film thereof exposed on the surfaces of the vessel—said film being that produced by the successive covering and uncovering of said surface hereinbefore referred to and that tending to be produced permanently above the surface of the bulk liquids as the same reduces in bulk by concentration.

In this way overheating of such film with deleterious effects such as coagulation or complete drying are avoided, and again the cooler surfaces may serve to effect a partial condensation tending to wash the exposed surfaces and to return the film cleanly to the bulk of the dispersion.

Conveniently the heating medium is a liquid such as water and it will be apparent that upon oscillation of the container the position of the heating medium in the space 18 will adjust itself automatically to the position of the liquid—thus the heat acts more directly upon the bulk liquid than upon the film thereof produced by the successive covering and uncovering aforesaid. Further the supply and withdrawal of the said liquid heating medium may be so adjusted that its level in the space 18 always coincides substantially with the level of the bulk liquid as it reduces by concentration—thereby ensuring that the film tending to be produced by such reduction is not submitted to heat so directly as in the bulk liquid.

Alternatively or additionally to either or both of these schemes part of the vessel surface may be entirely free from any external heating provision—as shown in Figure 1 for instance, the vessel may be provided with an unjacketed extension 41 and in order further to prevent conduction of heat from the jacketed part to said extension a heat insulating ring 42 may be provided between them.

It will be seen that the form of unheated surface shown in the drawings is particularly suited to avoid overheating of the film left by the reduction of bulk consequent upon concentration, it does however, also provide a cool surface for part of the film left by covering and uncovering and it will be apparent that such unheated surface may be designed specifically for either purpose or for both in any convenient proportion.

Our invention further includes provision to pass a current of air or other gas heated or not through the vessel to assist in the evaporation processes. Said current may be produced by blowing air or other gas into the vessel or again may be induced by drawing air or other gas thereinto or by a combination of these things.

As shown in Figure 3 a convenient arrangement comprises a fan 43 to force air through a heating chamber 44 and from thence through a flexible pipe 45 into the vessel 1 from whence it escapes through suitable orifices. For instance, see Figure 1, between the lid of the vessel and the lip of the extension thereof, a series of small spacing pads 46 are placed, thereby to form an incomplete annular orifice 47 through which the said air or other gas may escape.

In the preferred scheme, shown more or less diagrammatically in Figure 3, a cowl 48 is arranged around this orifice 47 and the air, together with the vapours arising from the liquid, is drawn therefrom via a pair of flexible pipes 49 oppositely disposed over the diameter of the vessel and connected together by a V-fitting 50 in communication with a suction fan 51.

It will however be apparent that we are not limited to any specific form of treating the atmosphere within the container, as for example, it will be apparent that the suction means may be dispensed with, or again it may be used instead of the blower means.

A further refinement, as shown in Figure 1, consists in means evenly to distribute the flow of air or other gas into the vessel, said means as shown in Figure 1 comprising a conical chamber 52 into which the pipe 45 discharges and from which cowl the air or other gas is distributed into the vessel via a plurality of orifices 53. Said orifices are preferably so disposed as to impart to the air or other gas a swirling flow or a flow substantially tangential to the circumference of the vessel said flow preferably moving in the same direction as the vessel walls. This flow may also be conveniently effected with the aid of short pipes 53a in some or all of the orifices 53 at the particular angle required to direct the air or other gas into the path desired.

And further provision of our invention more or less associated with the next preceding provisions—that is of air or other gas currents, consists in that the treatment of the liquid may be caused to be carried out while a pressure below that of atmosphere is maintained in the vessel. Where a gaseous medium has been introduced to aid evaporation it may be desirable to make provision for the reduction of the pressure within the vessel, when treatment of the liquid has ceased, to effect the removal of any entrained gas.

Various other mechanical features and incidental provisions of our invention include the following. For instance, one convenient scheme for driving the various parts comprises a motor 54 driving a shaft 55 which drives the pump 37, via chain and sprocket 56, a further shaft 57 which drives the table 5 via worm gearing 58. Obviously, incidental provisions such as a two or three speed gear, may be made in addition.

Again while the bearing 59 for the table 5 is shown plain it will be readily apparent that suitable anti-friction bearings such as ball or roller may be used if desired.

A further provision of our invention is that means are provided to facilitate the emptying of the vessel, the same as shown in the drawings conveniently consisting in that the vessel is adapted to be tilted as shown in Figure 4 about the axis 14 of the yoke bearings 11 and 11a the shaft 6 being slidable between the brackets 7; the pin 8 being removable for that purpose. Conveniently provision is made to facilitate such tilting, the same as shown in the drawings comprising a cranked lever 60 pivoted at 61 to the brackets 7, one end of the said lever engaging the shaft 6 and the other end being formed to take a leverage bar 62.

The engagement between the lever 60 and the shaft 6 conveniently comprises a pair of rollers 63 lying one each side the said shaft and disposed between brackets 64 to which the lever 60 is attached.

Still a further mechanical feature of our invention is that the vessel is closed with a lid 65 which is conveniently built up of a disc 66—perforated at 67 to provide an aperture for the insertion of ingredients during operation of the apparatus and at 68 for the pipe 45,—which said disc is reinforced by a more substantial structure 69 conveniently of spoked wheel-like formation. Said lid is secured in place by a wing nut 70 which clamps it down through the shank of the chamber 52 onto a flange stop 71 on the extension 6a of the shaft 6.

It is of course not to be construed that we are limited to the specific provisions of our invention hereinbefore set out or to the particular apparatus or details thereof hereinbefore described for carrying it into effect.

For instance, we may further make provision to assist in the maintenance of uniformity in the dispersion during concentration and further to maintain and improve the dispersion of fillers where present. For instance the base 24 of the vessel may serve as a race for one or more balls 24a adapted to roll—preferably beneath the surface of the liquid—around said base by gravitation as the oscillation proceeds and thereby submit to a rolling action any coarse particles present in the dispersion tending to collect at said base.

Furthermore, the re-habilitation of the partially evaporated layer or film in the bulk of the dispersion may be assisted by providing arms or projections, not shown in the drawings, within the vessel which arms may be rotatable or otherwise movable with respect to said vessel. Said arms may carry a flexible fin as of sheet rubber adapted to contact and lightly wipe the walls of the vessel to ensure that the said wall continually takes up a fresh film.

For carrying this arm scheme into effect conveniently the apparatus shown in the drawings would be modified, a convenient scheme consisting in preventing the shaft 6 rotating with respect to the table 5, extending said shaft through an axial bearing in the base of the vessel and attaching said radial arms to said extension 6a of said shaft, it being apparent that under these conditions the said shaft will rotate with respect to the vessel.

Again it will be apparent that we are not limited to the one specific means for producing the motion of the vessel we require. Referring to Figure 6, we illustrate diagrammatically as hereinbefore set out the motion we effect in the apparatus illustrated in the preceding drawings while Figures 7, 8 and 9 illustrate diagrammatically three alternate schemes in exemplification.

For instance, in Figure 7, the vessel 1 is suspended from a ball or other universal joint 72 by means of a rod 73 or the equivalent which extends upwardly for engagement with a rotary member 74—rotated by shaft 74a—by which member 74 the oscillatory motion is imparted to the vessel. Thus the upper end 73a of the rod 73 may engage within a radial slot 74b in the rotary member, the slot having a peripheral stop 74c so that while the vessel in the position of rest may fall by gravity into a position with its axis 75 approximately vertical, on rotation of the rotatable member 74 the orbit of oscillation of the vessel will gradually increase with the speed of rotation until limited by the engagement of the rod or shaft 73 with the peripheral stop 74c referred to. A detent may be incorporated in the spherical joint 72 to preclude rotation of the vessel on its own axis.

Again in Figure 8, which is a diagram in plan, the vessel 1 is mounted with its axis 76 vertical and is revolved bodily about an extraneous axis 77 by means of a pair of crank rods 78 commonly actuated and engaging the vessel at the points 79. This latter scheme will produce similar effects to the other two—the salient difference being that in this the liquid alters its relation to the sides of the vessel while in the other two schemes the vessel rather alters its position in relation to the liquid.

In passing it may be noted that this scheme illustrated in Figure 8 is quite closely analogous to the glass tumbler experiment.

And again in Figure 9 we illustrate a scheme to exemplify that we may effect a combination of the other motions. Here, as an example, the scheme according to Figure 6 is combined with that according to Figure 8 the transverse bearing member 16 being attached to the shaft 6 and a crank system 80, similar to that illustrated in Figure 8, being interposed between said member 16 and the base of the vessel, one end 80a of said cranks 80 co-acting with the base of the vessel and their other ends 80b, having a bearing at 81 in the transverse member 16, and being driven by chain and sprocket 82 at the reverse side of said member. In this instance the vessel will have a bodily revolution similar to that of the vessel in Figure 8 at the same time as it is oscillating bodily about the point 2 as in Figure 6.

It will be apparent that these last three schemes are given simply by way of example and that we do not confine ourselves to the particular arrangements illustrated diagrammatically for carrying them into effect.

Having completed our description in connection with the apparatus and sundry associated provisions of our invention we will now give a short description of the method of using it to produce the particular products which are our particular desideratum. It is not of course to be understood that we are limited to the precise particulars given here-under—they are simply given in exemplification.

The desired amount of compounding ingredients are mixed, to form a thin cream, into a quantity of water containing if desired dispersing and stabilizing agents in solution. This may be done separately or in the apparatus as desired. If separately the cream is then placed in the vessel together with the latex, or if in the apparatus the latex is added, and the apparatus is set in motion—its rocking or oscillation, it should be noted, being effected sufficiently gently to preclude foaming of the liquid or incorporation thereinto of bubbles of air. The apparatus being in motion the air or gas is introduced in the vessel and hot water is admitted to its jacket. In passing it should be noted that the temperature of the liquid to be concentrated is preferably not allowed to rise above 70° C. Treatment, concurrent concentration and compounding, is continued until the desired degree of concentration, of which the viscosity provides a convenient index, is almost attained—then vulcanizing agents are added in dispersion form and treatment is continued until the mixture has the desired degree of concentration—quite a short time it should be noted. During these processes—the motion of the vessel providing the required gentle continuous dispersive agitation and the continual exposure of fresh surfaces to evaporation—the particles of the compounding ingredients are evenly distributed and uniformity of the mixture effected so that there results a concentrate having the desirable characteristics hereinbefore set out, that is, a concentrate, which from its creamy consistency and from the processes going to the formation thereof inhibits subsequent separation or agglomeration of its components, as on storage.

Continuing our description—the air or gas current is then ceased and cold water in place of hot is circulated through the jacket of the vessel until the temperature of the mixture is reduced to less than 25° C.—the motions of the apparatus, it should be noted, still continuing, thereby to obviate skin formation. During the cooling stage ammonia may be added, if desired for the adjustment of the relationship of the viscosity and the concentration,—and finally the mixture is discharged and, preferably, strained.

By the processes of our invention we may produce a wide variety of mixtures—utilizing a wide range of compounding ingredients and a variety of stabilizers, but one fairly representative example is as follows:—

71.6 parts of rubber as ammonia preserved latex, 2.5 parts of sulphur, .5 parts of accelerator, 2 parts of zinc oxide, 3 parts of iron oxide, 7 parts of mineral oil, 6 parts of whiting, 6.7 parts of china clay, .2 parts of oleic acid, .1 part of casein and .4 parts caustic potash, the latter being the parts said while a convenient degree of concentration gives approximately 75 percent total solids.

Various modifications may be made by those skilled in the art without departing from the invention as defined in the following claims.

What we claim is:

1. In the concentration of liquid rubber latex, the method which comprises holding a body of said liquid in a vessel and imparting such a motion to the vessel that the angular relationship between the substantially plane top surface of the liquid and the portions of the wall of the vessel intersecting said surface is successively varied in a continuous recurrent sequence whereby a thin film of the liquid is successively spread over said wall and returned to the body of liquid, wherein the liquid and film thereof is subjected to the action of a heating medium in such manner that said medium acts more directly upon the bulk than upon the film.

2. An apparatus for treating liquid rubber latex and the like comprising a vessel, means for supporting the latter with freedom for universal tilting movement, and means for successively tilting said vessel in different vertical planes and a member adapted to roll upon the lower inner surface of the vessel to assist in the maintenance of uniformity of the liquid being treated and to improve the dispersion of compounding ingredients therein.

3. An apparatus for treating liquid rubber latex and the like comprising a vessel, means for supporting the latter with freedom for universal tilting movement about a point within the vessel, and means for successively tilting said vessel in different vertical planes in combination with supplemental means for manually tilting the vessel to facilitate emptying.

4. An apparatus for treating liquid rubber latex and the like comprising a vessel, means for supporting the latter with freedom for universal tilting movement about a point within the vessel, and means for successively tilting said vessel in different vertical planes in combination with means for supplying a current of gas or air to the vessel.

5. An apparatus for treating liquid rubber latex and the like comprising a vessel, means for supporting the latter with freedom for universal tilting movement about a point within the vessel, and means for successively tilting said vessel in different vertical planes in combination with means for maintaining a current of air through said vessel, and flexible connections between the vessel and the last named means.

6. An apparatus for treating liquid rubber latex and the like comprising a vessel, means for supporting the latter with freedom for universal tilting movement about a point within the vessel, and means for successively tilting said vessel in different vertical planes in combination with means for maintaining a current of air through said vessel, the latter having means whereby a swirling or tangential flow is imparted to said air current.

7. An apparatus for treating liquid rubber latex and the like comprising a vessel, a supporting structure therefor including a gimbal ring having a trunnion pivotally supported on a horizontal axis, a yoke secured to said vessel and having a pivotal connection with said gimbal ring at a point substantially ninety degrees from said trunnion, and power driven means operatively connected with said vessel arranged to tilt it in toward different points of the compass in combination with a jacket surrounding part of said vessel, and in which said yoke has a duct formed therein which connects with the jacket, and said gimbal ring having ducts therein connecting with said yoke ducts, and means for circulating a heating or cooling medium through said ducts and the said jacket.

8. An apparatus for treating liquid rubber latex and the like comprising a vessel, means for supporting the latter with freedom for universal tilting movement about a point within the vessel, and means for successively tilting said vessel in different vertical planes including a jacket surrounding a portion of said vessel and means for circulating a heating or cooling medium therethrough, said vessel having an upper unjacketed portion and a gasket of heat insulating material between the jacketed and unjacketed portions.

9. A method of treating liquid rubber latex which comprises continuously moving a body of said liquid latex in a continuous cycle of changing positions, causing the surface of said body of latex to change its position relative to the surface of a containing vessel to successively form a film of liquid on the wall of said vessel and immersing it in said body of latex, and applying heat to said vessel only at the area covered by said body of latex and moving the area of application of said heat to coincide with the movement of said liquid.

10. Apparatus for heat treating a liquid of the type described which comprises a container, means for heating surface areas of said container, and means for revolving said container with its axis of symmetry moving in a surface of rotation about another axis.

11. Apparatus for heat treating a liquid of the type described which comprises a container, means for heating surface areas of said container, means for revolving said container with its axis of symmetry moving in a surface of rotation about another axis, and means for causing said container to rotate about its axis of symmetry.

12. A method of evaporating an aqueous dispersion comprising rubber material, which comprises causing a mass of said dispersion to pass over a heated surface by passing the axis of symmetry of said surface in cyclic revolving motion in a surface of rotation as over the surface of a cone or cylinder about a substantially vertical axis.

13. A method of evaporating an aqueous dispersion comprising rubber material, which comprises causing a mass of said dispersion to pass over a heated surface by passing the axis of symmetry of said surface in cyclic revolving motion in a surface of rotation as over the surface of a cone or cylinder about a substantially vertical axis, and passing a current of air over the surface of said mass of dispersion and over said heated surface.

14. A method of evaporating an aqueous dispersion comprising rubber material, which comprises causing a mass of said dispersion to pass over a heated surface by passing the axis of symmetry of said surface in cyclic revolving motion in a surface of rotation as over the surface of a cone or cylinder about a substantially vertical axis, and limiting said application of heat to that area of the surface in contact with the mass of dispersion.

15. A method of evaporating an aqueous dispersion comprising rubber material, which comprises causing a mass of said dispersion to pass over a heated surface by passing the axis of symmetry of said surface in cyclic revolving motion in a surface of rotation as over the surface of a cone or cylinder about a substantially vertical axis, and subjecting said surface and said mass of dispersion to reduced pressure.

In witness whereof, we have hereunto signed our names.

DOUGLAS FRANK TWISS.
EDWARD ARTHUR MURPHY.